United States Patent [19]

Miller

[11] 3,807,972

[45] Apr. 30, 1974

[54] MATERIAL AND METHOD FOR ENHANCING COMBUSTION

[76] Inventor: John C. Miller, R.R. No. 1, Box 184 D, Franklin, Ind. 46131

[22] Filed: June 1, 1971

[21] Appl. No.: 148,939

[52] U.S. Cl................................. 44/51, 44/52
[51] Int. Cl.......................................... C10l 1/32
[58] Field of Search.......................... 44/53, 51, 52

[56] References Cited
UNITED STATES PATENTS

| | | | |
|---|---|---|---|
| 2,673,793 | 3/1954 | Brodhacker | 44/53 |
| 1,504,837 | 8/1924 | Ricardo | 44/53 |
| 2,897,067 | 7/1928 | Sparks et al. | 44/53 |
| 2,637,635 | 5/1953 | McLaughlin et al. | 44/53 |

*Primary Examiner*—Daniel E. Wyman
*Assistant Examiner*—Mrs. Y. H. Smith
*Attorney, Agent, or Firm*—Hood & Coffee

[57] ABSTRACT

A liquid for vaporizing and subsequent introduction, downstream from the carburetor, into the fuel stream of a gasoline-fired internal combustion engine, the liquid comprising water and a concentrate mixed with said water, the concentrate including methanol and nitro-methane. The concentrate may also include a suitable blender or blenders such as acetone and nitro-benzene. The acetone is effective to prevent separation of the nitro-methane and methanol.

25 Claims, No Drawings

MATERIAL AND METHOD FOR ENHANCING COMBUSTION

My invention is in the field of fuel additives for internal combustion engines, and particularly in fuel additives for mixing with air to produce vapors to be introduced into the firing chambers of gasoline-powered internal combustion engines.

It is known to inject combustion improvers into gasoline vapors to achieve more complete combustion in internal combustion engines. It is known, for instance, to inject water vapor into the intake manifold of an internal combustion engine. It is also known to inject vapors of alcohol mixtures, water and alcohol mixtures, and water, alcohol, propylene and acetone mixtures into intake manifolds of internal combustion engines. For many years, equipment for injecting vapors of such liquids into intake manifolds has been provided, such equipment usually including a reservoir for holding the liquid, means for admitting air to the liquid to cause it to vaporize, and means for conducting the vapor into the intake manifold. Generally, these systems utilize the engine's natural vacuum to pull the vapors from the upper closed space of the reservoir. The vapor is generally introduced into the pcv valve line and into the manifold to be mixed with the carburized gasoline.

It has long been taught that combustion is enhanced by the introduction of water vapor or water and alcohol vapor into the intake manifold, improving the power output and efficiency of the engine. By enhancing combustion, the vapor injection systems have been said to reduce emissions of unburned hydrocarbons, carbon monoxide and oxides of nitrogen while increasing emission of carbon dioxide.

I have experimented with water and methanol additives and have found that such water and methanol additives do enhance combustion and do tend to provide cleaner exhaust emissions. I have also discovered that by adding small amounts of nitro-methane to the water and methanol, I can very significantly improve the combustion characteristics of an engine.

The use of nitro-methane as an additive in racing fuels is known. For instance, many racing engines normally operate on pure methanol. When the operators of the racing cars want extra performance for limited periods of time, such as when qualifying for races, they add, for instance, 5 percent nitro-methane to the methanol in the fuel tank. Nitro-methane is a nitro paraffin and it releases free oxygen under compression and heat. In racing circles, nitro-methane is referred to as "pop."

In racing operations, it is sometimes the practice to produce increased combustion by mixing gasoline, benzene and methanol. Generally, these mixtures are approximately 15 percent gasoline, 5 percent benzene and 80 percent methanol. To the best of my knowledge, racing organizations seldom, if ever, use nitromethane with a gasoline blend.

It is an object of my invention to provide, for mixing with water, a concentrate comprising approximately 75 percent methanol, approximately 5 percent nitromethane, approximately 2 percent nitro-benzene and approximately 18 percent acetone, which water and concentrate mixture can be vaporized to produce vapors for injection directly into the intake manifold of a gasoline-powered internal combustion engine. This concentrate, when mixed with water to the ratio of one part concentrate and two parts water, produces a vapor which, when injected into the intake manifold of an automobile engine, significantly improves its combustion characteristics and its exhaust emissions. The nitrobenzene and acetone serve as blenders in my concentrate, tending to hold the other components against separation. The nitro-methane and methanol will sometimes separate unless there is a suitable blender. I believe that the acetone is effective to blend together or hold together the methanol and nitro-methane. I believe that the nitro-benzene assists in blending together the nitro-methane and methanol as well as assists in the blending of the concentrate and water vapors with the gasoline vapors. The nitro-benzene tends to reduce the odor of the concentrate. Without the nitro-benzene, the odor of the concentrate is readily distinguishable and not entirely pleasant.

It is an object of my invention to produce an improved fuel additive for a gasoline-fired internal combustion engine, such additive comprising methanol as a major ingredient and nitro-methane as a minor ingredient.

It is another object of my invention to provide a fuel additive comprising water, methanol and nitromethane in liquid form for vaporization and introduction into the intake manifold of an automobile engine or any other such internal combustion engine.

I modified a 1967 LTD Ford to install a vapor injection system and then utilized, in the reservoir of that system, a liquid formed with two parts water and one part concentrate, the concentrate including 75 percent methanol, 5 percent nitro-methane, 2 percent nitrobenzene and 18 percent acetone, which I presently believe to be an optimum formulation. The contents of the exhaust of the 1967 LTD Ford were tested without the system for comparison and then with the system including the water and concentrate. The results obtained were as follows:

TABLE I

|  | WITHOUT INJECTOR | WITH INJECTOR |
|---|---|---|
| ENGINE RPM 750 | | |
| Exhaust Temperature | 190°F | 220°F |
| % $CO_2$ | 9.9 | 13.0 |
| % $O_2$ | 1.7 | 3.7 |
| % CO | 4.2 | 0.1 |
| ppm $NO_2$* | 29 | 89 |
| ENGINE RPM 1500 | | |
| Exhaust Temperature | 380°F | 460°F |
| % $CO_2$ | 20.0 | 13.2 |
| % $O_2$ | 0.2 | 3.1 |
| % CO | 0.6 | 0.3 |
| ppm $NO_2$* | 220 | 232 |
| ENGINE RPM 3000 | | |
| Exhaust Temperature | 740°F | 765°F |
| % $CO_2$ | 14.6 | 14.4 |
| % $O_2$ | 0.4 | 1.0 |
| % CO | 0.2 | 0.2 |
| ppm $NO_2$* | 1130 | 1002 |

* The oxides of nitrogen, commonly called $NO_x$, are reported as $NO_2$ and are corrected to one atmosphere of pressure and 70°F temperature.

The tests to determine the exhaust contents were run in accordance with ASTM D 1608-60 (Reapproved 1967) for oxides and nitrogen from internal combustion engines. Specimens were collected in evacuated containers and then tested for oxygen, CO and $CO_2$ using an Orsat Gas Analyzer Apparatus accurate to ±

0.1 percent. The specimens were also tested for oxides of nitrogen by use of a detector tube method good to about 100 parts per million.

Then, I modified a 1971 Mercury to include a vapor injection system and, again, placed two parts water and one part concentrate comprising 75 percent methanol, 5 percent nitro methane, 2 percent nitro benzene and 18 percent acetone into the reservoir of the system. Tests were made on the exhaust emissions of the Mercury before and after installation and use of the vapor injector system. The system with the concentrate as specified did significantly decrease the carbon monoxide content of the exhaust from 5.3% to 0.1 percent at idling speeds of 750 rpm. It did not appreciably reduce the carbon monoxide output at 1,500 and 3,000 rpm.

TABLE II

|  | WITHOUT INJECTOR | WITH INJECTOR |
|---|---|---|
| ENGINE RPM 750 | | |
| Exhaust Temperature | 200–210°F | 250°F |
| % $CO_2$ | 10.9 | 13.2 |
| % $O_2$ | 0.7 | 3.1 |
| % CO | 5.3 | 0.1 |
| ppm $NO_2$ | 47 | 98 |
| ENGINE RPM 1500 | | |
| Exhaust Temperature | 380°F | 400–410°F |
| % $CO_2$ | 14.8 | 13.2 |
| % $O_2$ | 0.6 | 2.6 |
| % CO | 0.1 | < 0.1 |
| ppm $NO_2$ | 201 | 182 |
| ENGINE RPM 3000 | | |
| Exhaust Temperature | 700°F | 715°F |
| % $CO_2$ | 14.1 | 13.7 |
| % $O_2$ | 1.8 | 2.1 |
| % CO | <0.1 | <0.1 |
| ppm $NO_2$ | 899 | 843 |

Accurate tests for unburned hydrocarbons are not presently available. Unburned hydrocarbons in exhaust emissions are readily detected by their noxious odor. Normally, automobiles give off such noxious odors particularly at idling speeds. When an automobile is operated at idling speeds in closed space, the unburned hydrocarbons are very noxious. The 1967 LTD Ford and the 1971 Mercury equipped with the vapor injection system and utilizing the concentrate described above did not give off this noxious odor at idling speeds. These automobiles were operated in closed spaces and personnel worked in the closed spaces without any adverse effects. Normally, such personnel simply could not have worked in the closed spaces if the cars were operated at idling speeds. While unburned hydrocarbons are not easily tested by quantitative analysis techniques, I have concluded that my concentrate is effective for the purpose of reducing unburned hydrocarbons in exhaust emissions because it substantially eliminates the characteristic odor.

The test results disclosed above show that my concentrate has significantly reduced the carbon monoxide content and increased the carbon dioxide content of the exhaust emissions without significantly increasing, and, in some operative phases, actually decreasing the oxides of nitrogen. Further, my concentrate has been effective significantly to reduce the tailpipe exhaust odor, even to an undetectable level.

My concentrate has been effective significantly to increase the efficiency of automobile engines to the point that automobiles equipped with vapor injector systems which use my concentrate obtain significantly more miles per gallon of gasoline, some drivers having reported mileage improvements up to 20 percent.

The oxides of nitrogen contained in exhaust emissions are believed to be formed primarily by burning air in engines, i.e., the air component of the fuel mixture, because air is approximately 70 percent nitrogen. It is known that the amount of oxides of nitrogen in the exhaust emission of an engine increases as the temperature of the engine increases. Thus, I have run several temperature tests on the exhaust systems and components of engines equipped with vapor injector systems using my concentrate and have found that the temperatures are not significantly increased thereby.

While the optimum formulation for my concentrate is believed to be as stated above, and while I presently believe that the concentrate should be diluted with water in a ratio of 2 parts water to 1 part concentrate before vaporization, those formulae are by no means rigid. In fact, some of the beneficial results of my invention are attainable with a concentrate consisting of methanol and nitro-methane alone, so long as the methanol is the predominately major ingredient. Further improvement is noted when acetone is added, up to approximately 18 percent; and still further improvement occurs upon addition of nitro-benzene to 2 percent, but minor variations in formulation produce only minor variations in results.

My present belief is that my concentrate should include from between 2.5 percent and 7.5 percent nitromethane.

I claim:

1. A liquid additive for mixing with air to produce vapors to be introduced along with carbureted gasoline into the firing chambers of a gasoline-fired internal combustion engine, said liquid additive consisting of water, methanol and nitro-methane as essential ingredients and said ingredients being present in such amounts and proportions as to react among themselves and with the carbureted gasoline to promote combustion of the gasoline and reduce the deleterious contents of the exhaust emissions of said engine.

2. The liquid of claim 1 in which said liquid also includes approximately 18 percent acetone.

3. The liquid of claim 2 in which the liquid also includes approximately 2 percent nitro-benzene.

4. A liquid additive for vaporizing and subsequent introduction, downstream from the carburetor along with carbureted gasoline, into the fuel stream of a gasoline-fired internal combustion engine, said liquid comprising water and a concentrate mixed with said water, said concentrate including methanol and nitro-methane as essential ingredients, said water, methanol and nitromethane being present in said additive in such amounts and proportions as to react among themselves and with the carbureted gasoline to promote combustion of the gasoline and reduce the deleterious contents of the exhaust emissions of said engine.

5. The liquid of claim 3 in which the methanol and nitro-methane comprise, respectively, approximately 75 percent and 5 percent of the said concentrate.

6. The liquid of claim 5 in which the water-to-concentrate ratio is approximately 2 to 1.

7. The liquid of claim 6 in which said methanol and nitro-methane comprise, respectively, approximately 75 percent and 5 percent of said concentrate.

8. The liquid of claim 6 in which said methanol and nitro-methane comprise, respectively, approximately 75 percent and 5 percent of said concentrate with the balance of said concentrate being a blender effective to inhibit separation of the nitromethane and methanol.

9. The liquid of claim 6 in which said methanol and nitro-methane comprise, respectively, approximately 75 percent and 5 percent of the concentrate, the balance of said concentrate being primarily acetone.

10. A fuel additive for mixing with water to form a vaporizable solution for mixing with air to create vapors for introduction together with a vaporized mixture of gasoline and air directly into the intake manifold of a gasoline-fired internal combustion engine, said additive comprising methanol, nitro-methane and acetone, said methanol and nitro-methane being present in said additive as essential ingredients, said acetone being present in said additive as a blender effective to inhibit separation of the nitro-methane and methanol, and said water, methanol, nitro-methane and acetone being present in such amounts and proportions as to react among themselves and with the vaporized mixture of gasoline and air to promote combustion of the gasoline and reduce the deleterious contents of the exhaust emissions.

11. The fuel additive of claim 10 including approximately 2 percent nitro-benzene.

12. The fuel additive of claim 11 in which said methanol, nitro-methane, and acetone comprise, respectively, approximately 75 percent, 5 percent, and 18 percent of the fuel additive.

13. The fuel additive of claim 10 in which said nitro-methane comprises between 2.5 percent and 7.5 percent of said fuel additive.

14. A fuel additive for producing vapors for introduction with carbureted gasoline directly into the intake manifold of a gasoline-fired internal combustion engine, said additive consisting of methanol and nitro-methane, said methanol and nitro-methane being present in such amounts and proportions as to promote combustion of said carbureted gasoline to reduce harmful exhaust emissions.

15. The additive of claim 14 also including acetone as a blending agent, said acetone being present in amounts up to approximately 18 percent.

16. The additive of claim 14 in which said nitro-methane comprises approximately 5 percent of said additive.

17. The additive of claim 14 in which said methanol and nitro-methane comprise, respectively, approximately 75 percent and 5 percent of said additive.

18. The additive of claim 15 including approximately 2 percent nitro-benzene.

19. The additive of claim 18 in which said methanol, nitro-methane, and acetone comprise, respectively, approximately 75 percent, 5 percent, and 18 percent of said additive.

20. For injection in vaporized form directly into the intake manifold of a gasoline-fired internal combustion engine, there to mix with the carbureted gasoline, an additive concentrate consisting essentially of 2 parts of water and 1 part of a mixture of 75 percent methanol, 5 percent nitro-methane, 18 percent acetone and 2 percent nitro-benzene.

21. The additive of claim 1 in which said nitro-methane comprises between 2.5 percent and 7.5 percent of said fuel additive.

22. The additive of claim 6 in which said nitromethane comprises between 2.5 percent and 7.5 percent of said fuel additive.

23. The additive of claim 15 in which said nitromethane comprises between 2.5 percent and 7.5 percent of said fuel additive.

24. A liquid additive for mixing with air to produce vapors to be introduced along with carbureted gasoline into the firing chambers of a gasoline-fired internal combustion engine, said additive consisting of water and a concentrate mixed with said water at a mixture of approximately two parts water and one part concentrate, said concentrate consisting of methanol and nitro-methane as essential ingredients, said methanol and nitro-methane being present in such amounts and in such proportions as to react with the water and carbureted gasoline to promote combustion of the gasoline and reduce the deleterious contents of the exhaust emissions.

25. A liquid additive for mixing with air to produce vapors to be introduced along with carbureted gasoline into the firing chambers of a gasoline-fired internal combustion engine, said additive consisting of water and a concentrate mixed with said water at a mixture of approximately two parts water and one part concentrate, said concentrate consisting of methanol and nitro-methane as essential ingredients, said methanol and nitro-methane being present in such amounts and in such proportions as to react with the water and carbureted gasoline to promote combustion of the gasoline and reduce the deleterious contents of the exhaust emissions, said nitro-methane comprising between 2.5 percent and 7.5 percent of said concentrate.

* * * * *